Figure 1:
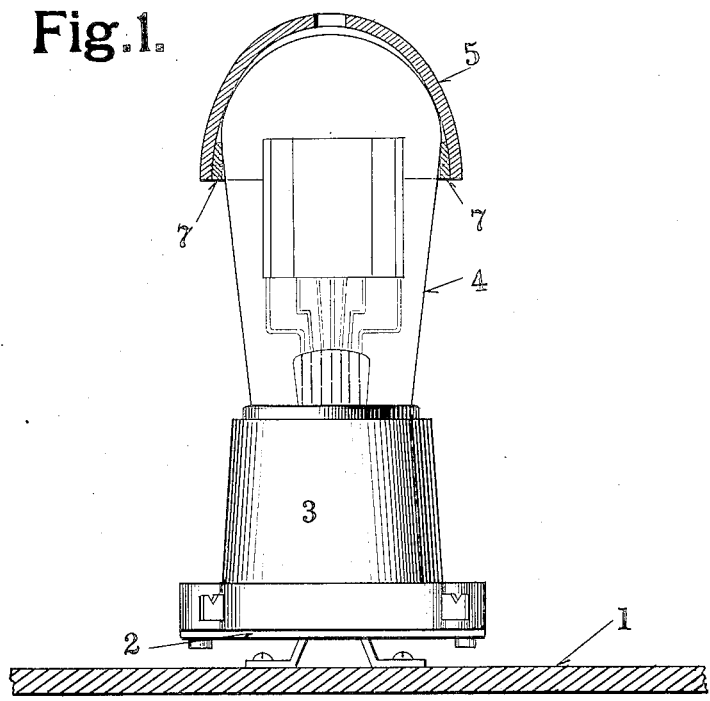

May 31, 1927.

C. C. LAURITSEN 1,631,100

VIBRATION DAMPING MEANS FOR VACUUM TUBES

Filed Feb. 25, 1926

INVENTOR
C. C. Lauritsen
BY E. E. Huffman
ATTORNEY

Patented May 31, 1927.

1,631,100

UNITED STATES PATENT OFFICE.

CHARLES C. LAURITSEN, OF ST. LOUIS, MISSOURI, ASSIGNOR, BY MESNE ASSIGNMENTS, TO THE DYAL COMPANY, OF ST. LOUIS, MISSOURI, A COPARTNERSHIP CONSISTING OF WALTER H. DYER AND A. R. ALLISON.

VIBRATION DAMPING MEANS FOR VACUUM TUBES.

Application filed February 25, 1926. Serial No. 90,506.

My invention relates to means for preventing or minimizing "microphonic" action in vacuum tubes used to rectify or amplify electric currents.

It is believed that the ringing tube noises of radio receiving sets, for example, are due to change in the space relation of the electrodes of the tube caused by physical shocks or other means producing vibration of the tube and consequently of one or more of its functioning elements. While the practice of mounting tubes on resilient supporting means (resilient socket mountings, resilient contact members engaging the tube terminals, or both) reduced the effect of shocks and vibrations imparted to the cabinet or other support on which the tubes are carried, it cannot eliminate their effect, and the resilient mounting affords less damping action to the tendency of a tube to vibrate as a result of external impulses than if it were not employed. Vibration of a tube with accompanying variation in plate current producing microphonic noise may be caused either by a single definite shock to the tube or its support, or by vibrations, such as of sound frequency, which are imparted to the support or directly to the tube through the medium of the air, by loud speakers employed in reproduction. In receiving apparatus in which the loud speaker and receiver are in the same cabinet, the vibration of the cabinet caused by the speaker horn, or by the sound waves it produces initiates vibration of the detector tube, for example, and the ringing noise resulting therefrom being amplified by other tubes and reproduced in the horn and air vibrations, reacts on the detector tube and tends to amplify and maintain the microphonic action of the tube with the result that such apparatus quite commonly produces a continuous "howling" noise interfering with otherwise satisfactory reception.

It is the object of my invention to eliminate or reduce to negligible proportions the microphonic action of a vacuum tube and I preferably accomplish this result by weighting the free end of the tube in such manner that there can be no relative motion between the tube and the weight. While I do not desire to be bound to any theory, I believe that the success of this expedient is due to the inertia of the weight means which tends to resist the initiation of tube vibrations, to reduce the vibration frequency and to quickly terminate such vibrations as may be initiated by a single shock. This retarding and damping of vibration of the tube either prevents vibration of the tube elements being initiated, or greatly reduces the period of time during which they continue, and their amplitude.

A further characteristic of the device is that the weight reduces the natural frequency of lateral vibration of the free end of the tube on its mounting as a pivot, and of the longitudinal and other vibration relative to its support, whereby it cannot be set into sympathetic vibration by vibrations either of the air or of the support which are of a frequency within music or speech range.

In the specific embodiment of my invention herein illustrated, the location of the weight at the free end of the tube and therefore at substantial distance from the axis of any lateral vibration of the tube, gives the weight a leverage action in resistance to vibration which of course increases with the length of the tube. The weight employed is relatively heavy and when used with vacuum tubes of the standard types now manufactured, the center of gravity of the combination is near the free end of the tube.

Figure 2:
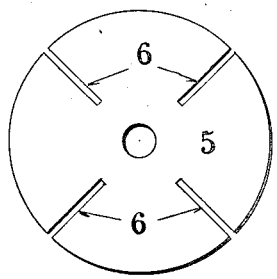
Figure 3:
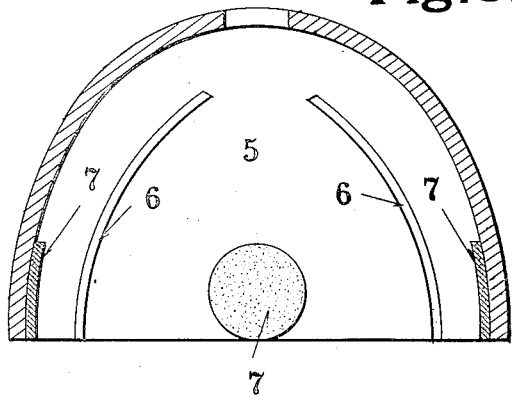

In the accompanying drawings Figure 1 shows a tube and its mountings, said tube being provided with a weight in accordance with my invention; Figure 2 is a top plan view of the weight shown in Figure 1; and Figure 3 is a cross sectional view of this weight.

1 represents a mounting board or panel, and 2 is a spring metal member having downturned portions secured to the support and carries the tube socket 3, having the usual spring terminals engaging the tube terminals (not shown). The thermionic tube 4 is of standard type having plate, grid and filament elements. The weighted cap 5 is of somewhat hemispherical shape, preferably but not necessarily substantially corresponding to the shape of the free end of the tube. This cap is preferably of metal and is provided with a plurality of slots 6 extending from its edge toward the top whereby the portions of the cap between these slots may be applied to tubes of slightly varying size and may have a resilient gripping action on the tube preferably through disks 7 of felt or other suitable material secured to the inner surface of the cap. Preferably the parts are so shaped and dimensioned that the glass wall of the tube contacts directly with the cap at a plurality of points, it being necessary to avoid even slight relative motion between the cap and tube.

Having fully described my invention, what I claim as new and desire to secure by Letters Patent of the United States is:

In apparatus of the class described, a weight member designed to be placed on a thermionic tube and comprising a relatively heavy cap adapted to embrace the free end of the tube, the lower portion of said cap being divided by slots whereby resilient tube gripping members are formed.

In testimony whereof, I hereunto affix my signature, this 19th day of February, 1926.

CHARLES C. LAURITSEN.